United States Patent
Naffziger

(10) Patent No.: US 8,595,528 B2
(45) Date of Patent: *Nov. 26, 2013

(54) SYSTEM AND METHOD FOR IMPLEMENTING AN INTEGRATED CIRCUIT HAVING A DYNAMICALLY VARIABLE POWER LIMIT

(75) Inventor: Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,301

(22) Filed: Nov. 8, 2011

(65) Prior Publication Data

US 2012/0054521 A1 Mar. 1, 2012

Related U.S. Application Data

(63) Continuation of application No. 10/320,586, filed on Dec. 16, 2002, now Pat. No. 8,086,884.

(51) Int. Cl.
*G06F 1/32* (2006.01)

(52) U.S. Cl.
USPC .......................................... 713/322; 713/320

(58) Field of Classification Search
USPC ................................................. 713/322, 320
See application file for complete search history.

(56) References Cited

U.S. PATENT DOCUMENTS

| | | | | |
|---|---|---|---|---|
| 5,378,935 A * | 1/1995 | Korhonen et al. | ............ | 327/114 |
| 5,764,529 A * | 6/1998 | Capps et al. | .................. | 716/138 |
| 5,778,237 A * | 7/1998 | Yamamoto et al. | ........... | 713/322 |
| 5,812,860 A * | 9/1998 | Horden et al. | ................. | 713/322 |
| 5,974,557 A * | 10/1999 | Thomas et al. | ............... | 713/322 |
| 5,987,617 A * | 11/1999 | Hu et al. | ......................... | 713/320 |
| 5,996,083 A * | 11/1999 | Gupta et al. | ................... | 713/322 |
| 6,047,248 A * | 4/2000 | Georgiou et al. | ............. | 702/132 |
| 6,459,175 B1 * | 10/2002 | Potega | .......................... | 307/149 |
| 6,509,788 B2 * | 1/2003 | Naffziger et al. | ............. | 327/548 |
| 6,513,124 B1 * | 1/2003 | Furuichi et al. | ............... | 713/322 |
| 6,535,056 B2 * | 3/2003 | Mizuno | ......................... | 327/544 |
| 6,625,737 B1 * | 9/2003 | Kissell | .......................... | 713/300 |
| 6,639,455 B2 * | 10/2003 | Mizuno | ......................... | 327/544 |
| 6,651,176 B1 * | 11/2003 | Soltis et al. | .................... | 713/300 |
| 6,664,775 B1 * | 12/2003 | Clark et al. | ..................... | 323/351 |
| 6,686,860 B2 * | 2/2004 | Gulati et al. | ................... | 341/155 |
| 6,765,434 B2 * | 7/2004 | Mizuno | ......................... | 327/544 |
| 6,766,460 B1 * | 7/2004 | Evoy et al. | ..................... | 713/323 |
| 6,772,356 B1 * | 8/2004 | Qureshi et al. | ................ | 713/321 |
| 6,976,178 B1 * | 12/2005 | Kissell | .......................... | 713/300 |
| 8,086,884 B2 * | 12/2011 | Naffziger | ...................... | 713/322 |

FOREIGN PATENT DOCUMENTS

| | | |
|---|---|---|
| DE | 10084547 | 3/2002 |
| DE | 10141626 | 3/2002 |
| DE | 69709911 | 6/2002 |

OTHER PUBLICATIONS

Alexander Klaiber, Transmeta Corporation, The Technology Behind Crusoe™ Processors Low-power x86-Compatible Processors Implemented with Code Morphing™ Software, Jan. 2000 (18 pages).

* cited by examiner

*Primary Examiner* — Chun Cao

(57) ABSTRACT

An integrated circuit having a dynamically variable power limit is provided. The integrated circuit comprises power management logic operable to receive notification of a dynamically set power limit value and operable to dynamically regulate the integrated circuit's power consumption to comply with the dynamically set power limit value.

20 Claims, 5 Drawing Sheets

SYSTEM AND METHOD FOR IMPLEMENTING AN INTEGRATED CIRCUIT HAVING A DYNAMICALLY VARIABLE POWER LIMIT

CROSS-REFERENCE TO RELATED APPLICATIONS

This application is a continuation of U.S. Ser. No. 10/320,586, filed Dec. 16, 2002, now U.S. Pat. No. 8,086,884, entitled "SYSTEM AND METHOD FOR IMPLEMENTING AN INTEGRATED CIRCUIT HAVING A DYNAMICALLY VARIABLE POWER LIMIT," and is also related to U.S. patent application Ser. No. 09/811,255, filed Mar. 16, 2001, now U.S. Pat. No. 6,509,788, entitled "SYSTEM AND METHOD UTILIZING ON-CHIP VOLTAGE CONTROLLED FREQUENCY MODULATION TO MANAGE POWER CONSUMPTION," both of which are hereby incorporated by reference.

FIELD OF THE INVENTION

This invention relates in general to management of power consumption by an integrated circuit, and more specifically to a system and method for implementing an integrated circuit having a dynamically variable power limit.

DESCRIPTION OF RELATED ART

Integrated circuits (commonly referred to as "chips"), such as microprocessors, are utilized in an ever-increasing number of various applications. For instance, such chips are commonly implemented not only in personal computers (PCs) and laptops, but are typically implemented in much smaller (and more portable) devices, such as personal digital assistants (PDAs), cellular telephones, pagers, and various other types of devices. Considering the number of tasks that such chips are relied upon to perform, the desire for fast processing speeds (to allow tasks to be performed quickly), and the desire for limited power consumption by such chips, chip designers are faced with the difficult task of designing chips that achieve the desired performance (e.g., fast processing speed), while managing the power consumption of the chips. Given the ever-increasing advances being made in performance of chips, such as microprocessors, power consumption is becoming a serious concern. For example, power consumption is becoming a serious performance limiter for high speed microprocessors. For instance, a key design objective for microprocessor systems is providing the highest possible peak performance for compute-intensive code, while reducing power consumption of the microprocessor system. Particularly when such microprocessor systems are to be implemented within portable electronic devices, reduction in power consumption (at least during low performance periods) is desirable to maximize the battery life of the device.

As is well known, the switching power consumption of a chip may be generally computed utilizing the following equation: $P=C*V^2*F$, wherein P represents power consumption, C represents switching capacitance, V represents operating voltage, and F represents the clock frequency of the chip. In view of such equation, it should be understood that switching capacitance (C), voltage (V), and frequency (F) are all factors in determining the power consumption (P) of a chip. In many cases, it is necessary to limit processor frequency (F) in order to hold the power consumption (P) of a chip below a certain level that is acceptable for use in a given system (e.g., within a desktop or portable devices).

Microprocessor chips of the prior art have typically been implemented with a fixed voltage and frequency determined to prevent the chip from consuming more than a particular amount of power. Typically, in designing prior art microprocessor chips, a designer tests the chip with software code for creating a heavy computational load on the chip in order to determine the appropriate voltage and frequency that may be implemented for the chip such that its power consumption does not exceed a particular amount when heavy computational loads are encountered by the chip. However, once implemented, such heavy computational loads may be encountered relatively seldom, with low (or no) computational load being placed on the microprocessor much of the time. Accordingly, the worst case computational loads dictate the voltage and frequency of the chip, thereby hindering performance of the chip (e.g., because of the decreased frequency required for the worst case).

Another common power-saving technique of the prior art attempts to reduce only the clock frequency (F) during non-compute intensive activity. This reduces power, but does not affect the total energy consumed per process. That is, a reduction in frequency (F) results in a linear reduction in the power consumed, but also results in a linear increase in task run-time, which causes the energy-per-task to remain constant. On the other hand, reducing only the voltage (V) of the processor improves its energy efficiency, but compromises its peak performance. It has been recognized in the prior art that if clock frequency (F) and supply voltage (V) are dynamically varied in response to computational load demands, then energy consumed per process can be reduced for the low computational periods, while retaining peak performance when required (i.e., for heavy computational periods). Design strategies attempting to utilize such dynamic variation of clock frequency (F) and supply voltage (V) based on computational loads are commonly referred to as dynamic voltage scaling (DVS).

One implementation proposed in the prior art utilizes DVS on a microprocessor under direct Operating System (OS) control. In such an implementation, one or more voltage scheduler algorithms are required in the OS of a DVS system, which are utilized to dynamically adjust the processor speed and voltage at run-time of a microprocessor. The voltage schedulers control the clock frequency (F) and supply voltage (V) of a microprocessor by writing a desired frequency (in MHz) to a coprocessor register. The voltage schedulers analyze the current and past state of the system in order to predict the future workload of the processor. For example, individual applications supply a completion deadline, and the voltage scheduler uses the applications' previous execution history to determine the number of processor cycles required and sets the clock frequency (F) accordingly. Interval-based voltage schedulers have been proposed in the prior art, which periodically analyze system utilization to control the frequency and voltage. As an example, if the voltage scheduler determines that the preceding time interval was greater than 50% active, it may increase the frequency and voltage for the next time interval. Thus, the system attempts to preserve the amount of power consumed by a microprocessor by having the OS dynamically adjust the clock frequency (F) to the minimum level required by the current active processes. Such an implementation that utilizes voltage scheduler algorithms (i.e., software) in the OS to dynamically control the voltage and frequency of a microprocessor is described in greater detail in *A Dynamic Voltage Scaled Microprocessor System*, by Thomas Burd, Trevor Pering, Anthony Sratakos, and Robert Brodersen, published in *Journal of Solid State Circuits* Vol. 35, No. 11, November 2000, and *The Technology Behind*

*Crusoe™ Processors*, by Alexander Klaiber (Transmeta Corporation), available (as of the filing of this application) at http://www.transmeta.com/pdf/white_papers/paper_aklaiber_19jan00.pdf, the disclosures of which are hereby incorporated herein by reference.

However, such an approach that utilizes the OS to dynamically control the voltage and frequency of a microprocessor is often problematic/undesirable. First, changing a system's OS to implement such an approach is typically very time consuming and/or costly. System administrators generally dislike upgrading their OS to improve their hardware. Additionally, the OS approach is not perfectly reliable because it has imperfect information about how much power the chip is actually consuming and what its compute needs are. Rather, the OS can only attempt to estimate/guess what is needed at the chip level. Furthermore, data necessary for the OS to intelligently estimate the power consumption and/or compute needs of a chip is typically chip specific, which results in greater difficulty in implementing/upgrading such an OS approach (because the OS implementation must be tailored to a specific chip technology that is implemented).

Yet another power-saving technique implemented in prior art microprocessor chips involves regulating the voltage of the on-chip power supply to reduce voltage droops, thereby allowing for higher clock frequency. More specifically, this technique attempts to improve the integrity of the on-chip power supply by regulating it carefully so that the average voltage to the chip can be reduced (i.e., because sudden changes in power consumption tend to cause the voltage to droop below average). By reducing the droops through voltage regulation, the average voltage on the chip can be reduced by the magnitude of such droop reduction with no frequency reduction, and such reduction in average voltage results in reduced power consumption by the chip. Such an implementation that improves the integrity of the on-chip power supply to reduce voltage droops of a microprocessor is described in greater detail in *An On-chip Voltage Regulator using Switched Decoupling Capacitors*, by Michael Ang, Raoul Salem, and Alexander Taylor, published in *ISSCC* 2000 Paper 26.7, the disclosure of which is hereby incorporated herein by reference.

Such prior art techniques generally aid in improving power integrity. However, such prior art techniques for improving power integrity attempt to supply extra current to a chip during high activity periods, thereby failing to actually reduce power consumption. Further, the additional current supplied during such periods is necessarily limited in supply by the quantity of capacitance.

Traditionally, chips have had a fixed power limit. For example, a chip is generally quoted (in its specification) as providing "X" performance (e.g., 100 MHz clock frequency) with a "Y" power limit (e.g., 100 Watts) under certain operating conditions (e.g., when below a "not-to-exceed temperature", etc.). Traditionally, the power limit of a chip is not dynamically variable. For instance, during run-time of traditional chips, their power limit is not changeable.

BRIEF SUMMARY OF THE INVENTION

In accordance with one embodiment of the present invention, an integrated circuit having a dynamically variable power limit is provided. The integrated circuit comprises power management logic operable to receive notification of a dynamically set power limit value and operable to dynamically regulate the integrated circuit's power consumption to comply with the dynamically set power limit value.

In accordance with another embodiment of the present invention, a system comprises means for processing a signal synchronous with a clock signal. The system further comprises a means for dynamically setting the power limit of the processing means to a desired value, wherein the processing means comprises means for self-regulating its power consumption to comply with a dynamically set power limit.

In accordance with another embodiment of the present invention an integrated circuit having a dynamically variable power limit is provided. The integrated circuit comprises core circuitry for processing, wherein such processing is synchronous with a clock signal. The integrated circuit further comprises a mapping structure that maps different power limit values to corresponding frequency values of the clock signal. The integrated circuit also comprises power management logic operable to receive notification of a dynamically set power limit value for the integrated circuit, determine based at least in part on the mapping structure a frequency value of the clock signal for complying with the dynamically set power limit value, and dynamically set the clock signal to a determined frequency value for managing power consumption of the integrated circuit to comply with the dynamically set power limit value.

In accordance with another embodiment of the present invention, a method for providing an integrated circuit having a dynamically variable power limit and predictable performance is provided. The method comprises characterizing a plurality of integrated circuit units of a particular design that comprise core circuitry for processing, wherein such processing is synchronous with a clock signal and wherein the characterizing determines, for each of a plurality of different power limit values of the integrated circuit units, a predictable clock signal frequency that is achievable within a tolerance by all of the plurality of integrated circuit units of the particular design without their power consumption exceeding the corresponding power limit value. The method further comprises constructing a mapping structure that maps the determined predictable clock signal frequencies to corresponding power limit values, and implementing the mapping structure in a system that includes an integrated circuit of the particular design for use in dynamically varying the integrated circuit's power limit.

In accordance with another embodiment of the present invention, a method for dynamically varying an integrated circuit's power limit is provided. The method comprises receiving, at an integrated circuit, notification that its power limit setting is changed to a different value, and the integrated circuit self-regulating its power consumption to comply with the different value of its power limit setting.

DETAILED DESCRIPTION

Figure 1:
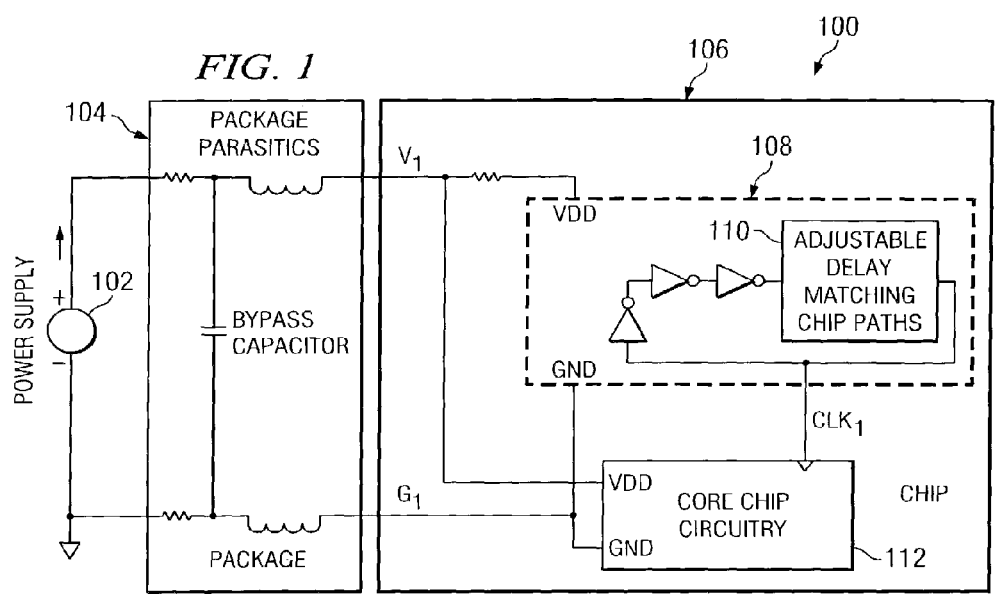
FIG. 1 shows an embodiment for managing a chip's power consumption which utilizes an on-chip voltage controlled oscillator to dynamically adjust the frequency of the chip's clock to track voltage which is varied to manage the power consumption of the chip.

In view of the prior art, a desire exists for a method and system for better managing power consumption of a chip. Further, a desire exists for a technique that enables a chip's power limit to be dynamically varied. That is, a desire exists for a technique that enables a chip's power limit to be dynamically varied (e.g., to a value below its maximum power limit) and for dynamically managing the chip's power consumption so as to comply with a dynamically set power limit.

Embodiments of the present invention provide an integrated circuit (or "chip") that has a variable power limit. That is, an integrated circuit, such as a microprocessor, is provided that is capable of having its power limit dynamically varied to any of a plurality of different values. Preferably, the chip is implemented in a manner that enables any of a plurality of different measured power limits to be dynamically set for the chip. That is, the chip's power limit can be dynamically set to any of a plurality of specific power limit values. Accordingly, in certain embodiments the chip's power limit value can be dynamically selectable from a plurality of different values (e.g., a range of power limit values).

Certain techniques exist in the prior art for changing the voltage level (or operating point) of a chip. For example, Intel® Corporation's Speed Step™ technology is available in the prior art. With the Speed Step™ technology, a chip has two operating points: one at high voltage, maximum performance, and another at a lower voltage, lower performance. Accordingly, the chip may operate at the higher operating point under certain conditions and it may dynamically change its operation to the lower operating point under other conditions. For example, the chip may be implemented in a notebook computer, and the chip may operate at its higher operating point as long as the notebook computer is connected to an alternating current (AC) power source and it may vary its operation to the lower operating point when the notebook computer is removed from the AC power source (e.g., to preserve the notebook computer's battery). By reducing the chip's operating point to a lower voltage and lower frequency, the chip's power consumption will be reduced to some degree below that consumed at the higher operating point (recall $P=C*V^2*F$). Thus, the chip's power may be indirectly varied when changing from the higher operating point to the lower operating point.

However, with the Speed Step™ technology, the chip's power limit is not dynamically set to a measured value. That is, while changing from a higher operating point to a lower operating point reduces the chip's power consumption, the resulting power limit is not managed to a measured value but may instead vary between a range of values (e.g., the resulting power limit when changing to the lower operating point may vary between 10 and 50 Watts, for instance). The amount that the resulting power limit is reduced for the lower operating point may vary from chip to chip. Accordingly, a measured power limit is not dynamically set for chips implementing the Speed Step™ technology, but instead their power limit is indirectly varied by some unmanaged amount as a result of reduced voltage and frequency at the lower operating point. As described further below, embodiments of the present invention enable a measured power limit to be dynamically set for a chip. For instance, a chip's power limit may be dynamically selected from a range of power limit values.

Various situations exist in which it may be desirable to dynamically vary the power limit of a chip. For instance, a microprocessor chip may be implemented in a multi-processor server system, such as a Utility Data Center, and during periods of low computational loads such microprocessor chip may not be required to be utilized and it may therefore be desirable to reduce its power limit during those periods. Power management software may be implemented in the Utility Data Center for monitoring the workloads of the various processors and manage the power limits of those processors (e.g., to raise the power limits during high computational loads for increased performance and to lower the power limits during lower computational loads for power conservation). As another example, a chip may be implemented in a portable device, such as a mobile telephone (e.g., cellular telephone), personal data assistant (PDA), laptop (or "notebook") computer, etc., and its power limit may be dynamically varied to extend the battery life of such devices (when not coupled to an AC source). Various other applications will be apparent to those of ordinary skill in the art in which it may be desirable to have a chip's power limit be dynamically variable.

Embodiments of the present invention provide an integrated circuit that is capable of dynamically varying its power consumption to comply with a dynamically set power limit. That is, a chip is provided that is capable of having its power limit dynamically varied, and the chip dynamically varies its power consumption to comply with any of a plurality of different power limits that may be specified for the chip.

Further, an embodiment of the present invention provides a chip that is implemented to provide optimum performance within a specified power limit. That is, the chip's power limit may be dynamically varied, and upon a specific power limit being set for the chip, the chip varies its power consumption in a manner to comply with the set power limit but it varies its power consumption in a manner to provide optimum performance within the set power limit. For example, the chip's voltage and frequency are preferably dynamically varied to provide optimum performance within a set power limit, such as is disclosed in U.S. patent application Ser. No. 09/811,255 entitled "SYSTEM AND METHOD UTILIZING ON-CHIP VOLTAGE CONTROLLED FREQUENCY MODULATION TO MANAGE POWER CONSUMPTION," filed Mar. 16, 2001 (now U.S. Pat. No. 6,509,788), the disclosure of which is hereby incorporated herein by reference.

Further, certain embodiments of the present invention enable predictable performance under any of a plurality of different power limits that may be dynamically set for the chip. Having predictable performance under each power limit that may be dynamically set for a chip is generally desirable.

As will be appreciated by those of ordinary skill in the art, the actual power consumed by a semiconductor device, such as a microprocessor, varies considerably based upon its operating conditions, like temperature and manufacturing variations in different devices. Accordingly, if the power limit is dynamically reduced from a chip's maximum power limit to some smaller amount, the performance achievable under the newly set power limit may vary considerably between various different chips of the same design. That is, in a given design of microprocessor chips, the performance may vary considerably between such chips when their power limit is dynamically reduced. As described further below, one embodiment of the present invention provides a technique for providing predictable performance within an acceptable tolerance (e.g., 5% or less) achievable for a chip design at various different power limit values.

While any suitable technique now known or later discovered for a chip self-regulating its power consumption may be utilized in conjunction with embodiments of the present invention, a preferred technique for a chip self-regulating its power consumption to maintain such power consumption within a set power limit is disclosed in U.S. patent application Ser. No. 09/811,255 entitled "SYSTEM AND METHOD UTILIZING ON-CHIP VOLTAGE CONTROLLED FREQUENCY MODULATION TO MANAGE POWER CONSUMPTION." Preferably, the technique utilized enables the chip's performance to be varied in a manner such that it provides optimum performance under the set power limit. The technique disclosed in U.S. patent application Ser. No. 09/811,255 entitled "SYSTEM AND METHOD UTILIZING ON-CHIP VOLTAGE CONTROLLED FREQUENCY MODULATION TO MANAGE POWER CONSUMPTION" (now U.S. Pat. No. 6,509,788) for managing a chip's power consumption is described below in conjunction with FIGS. 1-3. As described below, such technique enables the chip to provide optimum performance under a given power limit. Further, in one embodiment, power management logic is implemented to manage the chip's power consumption in a manner that provides optimal, predictable performance. That is, the optimal performance that is predictably achievable for the chip (e.g., consistently achievable for chips of a this particular design) at the set power limit is provided. In this manner, a designer and/or power management application may make intelligent decisions about the power limit to be set for the chip, or for a given product in which the chip is implemented, at any given time because the chip's performance at various power limit values is predictable.

Turning to FIG. 1, a portion of a system 100 that implements an embodiment for managing a chip's power consumption that may be used with certain embodiments of the present invention is shown. As shown, power supply 102 supplies power to a chip 106. More specifically, a voltage signal and ground signal are supplied by power supply 102, which are typically fed through some package parasitics 104 to chip 106. Such package parasitics 104 are well known to those of ordinary skill in the computer arts, and therefore will not be described in great detail herein. Thus, the resulting voltage signal $V_1$ and ground signal $G_1$ are received by chip 106. Chip 106 comprises a voltage controlled frequency oscillator 108, which generates chip clock $CLK_1$ that is utilized as the clock signal for the core chip circuitry 112. It should be understood that chip 106 may be any type of integrated circuit, including without limitation a microprocessor. Core chip circuitry 112 may include any clocked circuitry components of chip 106, such as logic to execute instructions in a microprocessor, storage elements for information the chip may utilize for performing operations, arithmetic processing logic, etc.

As shown in FIG. 1, in one embodiment, the received voltage signal $V_1$ and ground signal $G_1$ are fed both to core chip circuitry 112 and oscillator 108. In such embodiment, oscillator 108 adjusts the frequency of clock $CLK_1$ generated thereby based on the value of voltage $V_1$. More particularly, oscillator 108 is most preferably a ring oscillator (which includes a loop with an odd number of inversions), and such ring oscillators are well known in the art. Most preferably, circuitry 110, which is well known to those of ordinary skill in the art, is included in oscillator 108 to adjust the frequency of $CLK_1$ based on the value of voltage $V_1$. Such circuitry 110 may include any switched capacitive or resistive elements that effect the loop delay of ring oscillator 108, and because such elements are generally well known in the art, they are not described in greater detail herein.

For instance, as voltage $V_1$ decreases, the frequency of $CLK_1$ output by oscillator 108 decreases. As a result, voltage controlled oscillator 108 of this embodiment allows for chip 106 to self-regulate its power consumption. It will be recalled that the power consumption of chip 106 may be approximated utilizing the equation $P=C*V^2*F$, wherein P represents power consumption, C represents switching capacitance, V represents operating voltage (e.g., voltage $V_1$), and F represents the clock frequency of chip 106 (e.g., frequency of $CLK_1$). Thus, by oscillator 108 dynamically adjusting the clock frequency of chip 106 (i.e., the frequency of $CLK_1$) in response to changes in the voltage $V_1$, the chip may self-regulate its power consumption while providing the maximum frequency possible at voltage V1.

Figure 2:
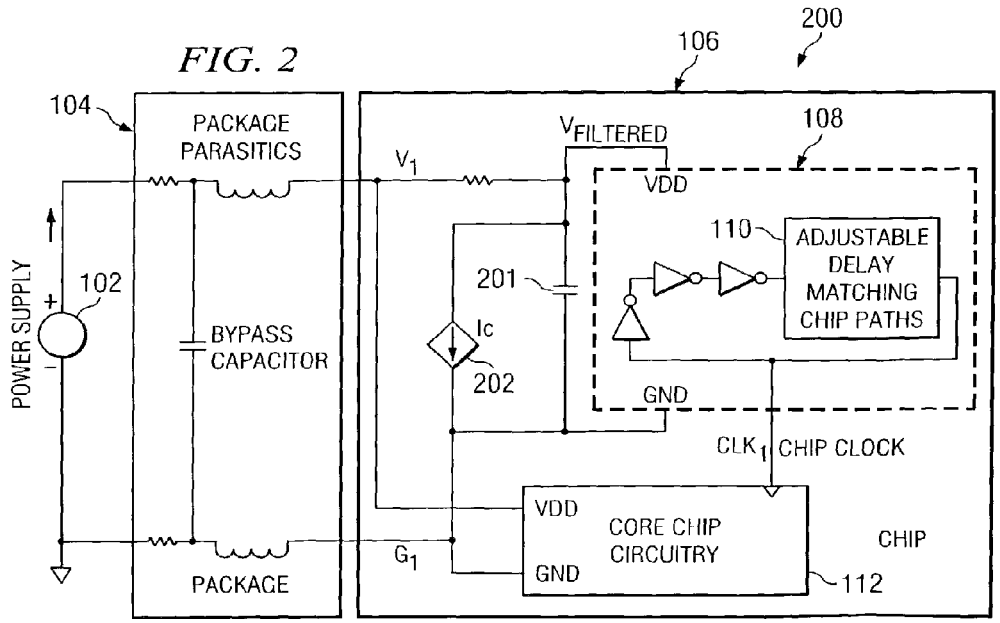
FIG. 2 shows an alternative embodiment for managing a chip's power consumption which includes circuitry for controlling the voltage input to the on-chip voltage controlled oscillator to allow for the frequency of the chip's clock output by such oscillator to be controlled in a desired manner.

Turning to FIG. 2, an alternative embodiment for managing a chip's power consumption, which is similar to the above embodiment of FIG. 1, is shown, wherein like reference numbers are used to identify like components. More specifically, a portion of a system 200 which implements such an alternative embodiment of the present invention is shown. As with the example embodiment of FIG. 1, power supply 102 supplies power to a chip 106. More specifically, a voltage signal and ground signal are supplied by power supply 102, which are typically fed through package parasitics 104 to chip 106. As described above with reference to FIG. 1, the resulting voltage signal $V_1$ and ground signal $G_1$ are received by chip 106.

Chip 106 comprises voltage controlled frequency oscillator 108, which generates chip clock $CLK_1$ that is utilized as the clock signal for the core chip circuitry 112. Core chip circuitry 112 may include any clocked circuitry components of chip 106, as described above with reference to FIG. 1. The received voltage signal $V_1$ and ground signal $G_1$ are fed both to core chip circuitry 112 and oscillator 108. As shown in FIG. 2, capacitor 201 is included, which acts as a charge reservoir in that charge not consumed by the chip circuitry during low power periods can be stored away to be delivered to the chip during bursts of high power activity. This enables burst of high power (and high performance) activity to be sustained for some predetermined period of time before the voltage droops (i.e., when capacitor 201 is depleted of charge) and the chip self-throttles its power consumption and hence slows down. Of course, it should be understood that such a capacitor 201 may likewise be implemented in the embodiment of FIG. 1, even though it is not shown or described therewith.

Additionally, in this alternative embodiment, control circuitry 202 is included on chip 106. Such control circuitry 202 is capable of controlling the voltage supplied to oscillator 108, thereby controlling the frequency of the output clock signal $CLK_1$. For example, sensor(s), such as a voltage sensor and/or thermal sensor, may be utilized to monitor the voltage level drawn by core circuitry 112, and may communicate such voltage level to control circuitry 202. In turn, control circuitry 202 may control the voltage input to oscillator 108, thereby dynamically controlling the output frequency of oscillator 108 (i.e., the frequency of $CLK_1$) to manage the chip's power consumption. It should be understood that control circuitry 202 may be implemented on chip 106 with software executing thereon for managing the chip's power consumption (e.g., may be implemented as firmware).

Thus, control circuitry 202 allows for voltage controlled oscillator 108 to be utilized to manage the power consumption of chip 106 without necessarily requiring the identical voltage $V_1$ supplied to the core chip circuitry 112 to always be input to oscillator 108. For example, circuitry (e.g., sensors) may be included for monitoring the value of voltage $V_1$, and such circuitry may cause control circuitry 202 to adjust the voltage supplied to oscillator 108 only upon the value of voltage $V_1$ achieving a particular threshold level. For instance, control circuitry 202 may maintain the voltage input to oscillator 108 at a first value "X" until it is determined by circuitry (not shown) that monitors the value of the voltage $V_1$ input to chip 106 that such value achieves a threshold value "T," and upon voltage $V_1$ achieving such threshold value "T" control circuitry 202 may adjust the value of the voltage input to oscillator 108 to a second value "Y," which may be the value of voltage $V_1$. Thus, by oscillator 108 dynamically adjusting the clock frequency of chip 106 (i.e., the frequency of $CLK_1$) in response to the voltage value supplied to oscillator 108 as controlled by control circuitry 202, chip 106 may self-regulate its power consumption.

Figure 3:
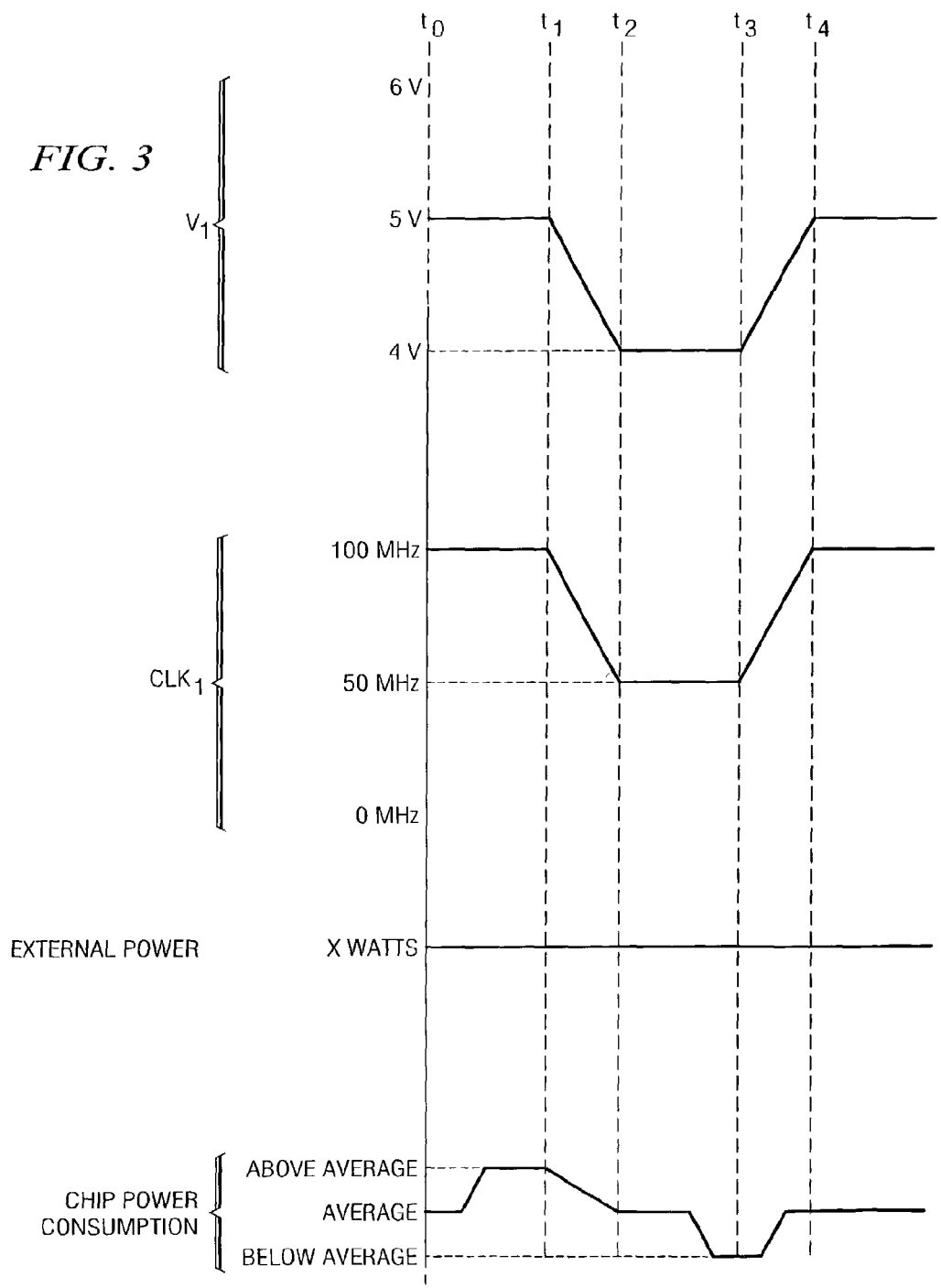
FIG. 3 shows exemplary wave forms that illustrate the operation of an embodiment for managing a chip's power consumption.

Turning now to FIG. 3, exemplary wave forms are shown that illustrate operation of an embodiment of power management logic for managing a chip's power consumption. More specifically, an exemplary wave form is shown for voltage $V_1$ input to chip 106, clock $CLK_1$ generated by oscillator 108, external power distributed to chip 106, and instantaneous chip power consumption. As shown, at time $t_0$, voltage $V_1$ is 5 volts (V) and the frequency of clock $CLK_1$ is 100 megahertz (MHz), resulting in a desired value of "X" watts of external power required to be distributed to chip 106. As the example of FIG. 3 illustrates, in an embodiment of power management logic, the external power distributed to chip 106 remains relatively constant, while the instantaneous chip power consumption may vary significantly over time. For instance, at time $t_0$, the chip power consumption is at its average value. Some time later, between time $t_0$ and time $t_1$, the instantaneous chip power consumption goes above average (e.g., compute intensive operation may be performed by the core circuitry, thus causing the instantaneous chip power consumption to increase above average). When the chip power goes above average power, capacitor 201 starts draining charge to supply the chip, in one embodiment. Thus, as the example of FIG. 3 shows, voltage $V_1$, frequency of $CLK_1$, and the external power distributed to chip 106 remain relatively constant from the time that the chip power increases above average until time $t_1$ (because capacitor 201 drains its charge to supply the chip the additional needed power).

Over time, if the chip power consumption remains above average, the charge will drain from capacitor 201 and voltage $V_1$ will droop, resulting in the chip power being reduced to the average value. For example, at time $t_1$, capacitor 201 is still supplying the necessary power to enable voltage $V_1$ to remain at 5V. Further, the frequency of clock $CLK_1$ output by oscillator 108 remains 100 MHz, with external power distributed to chip 106 remaining at a desired value "X" watts. From time $t_1$ to time $t_2$, voltage $V_1$ droops from 5V to 4V (e.g., as the charge is drained from capacitor 201), and in response the frequency of clock $CLK_1$ output by oscillator 108 gradually decreases from 100 MHz to 50 MHz to maintain the external power distributed to chip 106 substantially at the desired "X" watts. As further shown in the example of FIG. 3, the decrease in voltage $V_1$ and frequency of $CLK_1$ results in a decrease in the instantaneous chip power consumption (back to its average). From time $t_2$ to time $t_3$ voltage $V_1$ remains at 4V, and in response the frequency of clock $CLK_1$ output by oscillator 108 remains at 50 MHz, thereby maintaining the instantaneous chip power consumption of chip 106 substantially at its average, while the external power required by chip 106 remains at the desired "X" watts.

Some time after time $t_2$, the instantaneous power chip consumption decreases below its average (e.g., as the compute intensive operation is completed). Thus, in response, from time $t_3$ to time $t_4$, voltage $V_1$ gradually increases from 4V back to 5V, and in response the frequency of clock $CLK_1$ output by oscillator 108 gradually increases from 50 MHz to 100 MHz. Accordingly, as the value of voltage $V_1$ increases, the frequency of clock $CLK_1$ output by oscillator 108 increases, thereby allowing faster operation of the core circuitry 112 of chip 106 without requiring an increase in external power distributed to chip 106. It should be recognized that in one embodiment, the external power distributed to chip 106 remains relatively constant (i.e., at the desired "X" Watts) while the chip power consumption is below average to enable power to be stored away in the form of charge on capacitor 201 (e.g., to replenish the charge of capacitor 201). As voltage $V_1$ and the frequency of $CLK_1$ increase, the instantaneous chip power consumption returns to its average. After time $t_4$, chip power consumption remains substantially at its average, and thus, voltage $V_1$ remains at 5V. In response to voltage $V_1$ remaining at 5V, the frequency of clock $CLK_1$ output by oscillator 108 remains at 100 MHz, thereby maintaining the external power required to be distributed to chip 106 at the desired "X" watts.

As shown in the example of FIG. 3, an embodiment of power management logic for self-regulating a chip's power consumption utilizes on-chip oscillator 108 to dynamically generate clock frequency $CLK_1$ for the core circuitry 112 of chip 106 responsive to voltage $V_1$ in order to manage the power consumption of chip 106. Accordingly, it should be recognized that an embodiment provides a seamless and fine-grained approach to getting the most performance per Watt. For example, an embodiment allows for operation at the highest processing speed (or fastest clock frequency) that is possible while remaining within a desired power consumption. For instance, the chip's clock frequency supplied by on-chip oscillator 108 can dynamically adjust such that it is consistently at the fastest frequency possible to remain within the desired power consumption.

It should be recognized that in one embodiment of the power management logic, upon a reduced voltage being encountered by a chip, which may be caused by sustained high power activity on the chip (or specific voltage management techniques introduced by current source 202), as examples, one embodiment dynamically reduces the chip frequency (e.g., $CLK_1$) just enough to keep the chip functional at such reduced voltage (which is the responsibility of oscillator 108). More specifically, as the chip's core circuitry 112 draws more current, thereby reducing the voltage input to oscillator 108, the frequency of $CLK_1$ output by such oscillator 108 decreases. On the other hand, as the chip's core circuitry 112 draws less current, thereby increasing the voltage available to the oscillator, the frequency of $CLK_1$ output by such oscillator 108 increases.

It should also be recognized that an embodiment of power management logic provides a simple means of tying performance to power. That is, an embodiment provides a relatively simple way for linking the clock frequency of a chip to its power consumption, in a dynamic manner. For example, suppose an increased number of power hungry units (or components) are suddenly activated on chip 106. An embodiment of power management logic enables chip 106 to dynamically respond to such increased number of activated units by decreasing the voltage and hence the clock frequency generated by oscillator 108 to manage the chip's power consumption. Furthermore, due to the cubic reduction in power achieved with a simultaneous frequency and voltage reduction (recall $P=C*V^2*F$), the power/performance tradeoff is much better than coarse, functional methods such as throttling units or disabling ports.

It should also be recognized that an embodiment of power management logic enables elimination of the PLL (phase locked loop) as the source of the varying frequency as is commonly required in prior art microprocessor designs, which is typically very difficult to design. That is, implementation of on-chip oscillator 108 to generate the clock for the chip's core circuitry, a PLL re-lock (a time consuming process for changing frequency) is not required to be implemented in an embodiment, which may aid in simplifying the design of a chip.

Furthermore, it should be understood that the above-described embodiments of power management logic for managing power consumption within a chip may be implemented within any type of integrated circuit, and any such implementation is intended to be within the scope of the present invention. As examples, such embodiments may be implemented within such integrated circuits as microprocessors, embedded controllers, network routers, graphics processors, and any other application specific integrated circuits (ASICs). Although, an implementation is most preferably utilized within a microprocessor chip.

Figure 4:
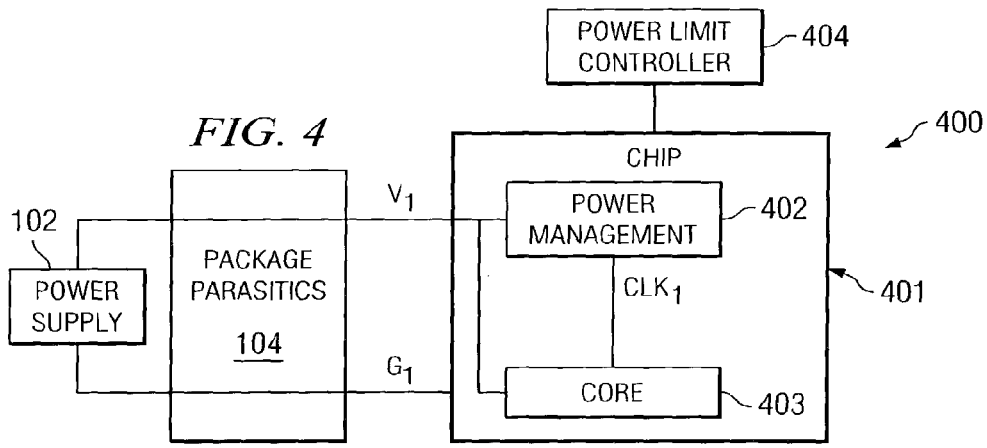
FIG. 4 shows an embodiment of the present invention in which a chip's power limit is dynamically variable.

Embodiments of the present invention enable the power limit of a chip, such as chip 106 in the above examples, to be dynamically varied. Turning to FIG. 4, a portion of a system 400 which implements an embodiment of the present invention is shown. As shown, power supply 102 supplies power to a chip 401. More specifically, a voltage signal and ground signal are supplied by power supply 102, which are typically fed through some package parasitics 104 to chip 401, as described above in conjunction with FIGS. 1 and 2. Thus, the resulting voltage signal $V_1$ and ground signal $G_1$ are received by chip 401. It should be understood that, as with chip 106 described above, chip 401 may be any type of integrated circuit, including without limitation a microprocessor. Chip 401 comprises core chip circuitry 403, which may include any clocked circuitry components of chip 401, such as logic to execute instructions in a microprocessor, storage elements for information the chip may utilize for performing operations, arithmetic processing logic, etc.

Chip 401 further comprises power management logic 402 for self-regulating its power consumption. Preferably, such power management logic 402 may be implemented in the manner described in FIG. 1 or FIG. 2 above. For instance, such power management logic 402 may comprise a voltage controlled frequency oscillator (e.g., oscillator 108 of FIG. 1 or 2 above) that generates a clock signal (e.g., $CLK_1$ in above examples of FIGS. 1 and 2) that is utilized as the clock signal for the core chip circuitry 403. As described above, the frequency of such clock signal may be dynamically varied by power management logic 402 to regulate the chip's power consumption in order to maintain such power consumption within a given power limit. Additionally, as described below, power management logic 402 is preferably operable to control power supply 102 to dynamically change the supply voltage ("VDD") supplied to chip 401.

Further included in system 400 is power limit controller 404. Power limit controller 404 is operable to dynamically set the power limit of chip 401 to any of a plurality of different values. That is, power limit controller 404 may dynamically set the power limit of chip 401 to any of a plurality of different measured power limits (or specific power limit values). Power management logic 402 is operable to dynamically vary the chip's performance (e.g., vary the clock frequency supplied to core circuitry 403) and control the voltage $V_1$ delivered by power supply 102 in order to comply with a dynamically set power limit. That is, power management logic 402 is operable to self-regulate the power consumption of chip 401 to comply with a dynamically set power limit.

Power limit controller 404 may comprise any logic in system 400 for setting the power limit of chip 401. For example, power limit controller 404 may, in some systems, comprise power management software that controls the power limit to be in effect for chip 401 at any given time. As another example, power limit controller 404 may, in certain systems, comprise hardware for monitoring chip 401 (e.g., its activity, temperature, etc.) and dynamically vary the power limit for such chip 401. Accordingly, although power limit controller 404 is shown in the example of FIG. 4 as residing off of chip 401, in certain implementations it may comprise circuitry implemented on chip 401 for setting the chip's power limit. Thus, in certain embodiments, chip 401 may itself comprise power limit controller 404 such that it can dynamically determine the proper power limit for itself and use power management logic 402 for regulating its power consumption to comply with the determined power limit.

Chip 401 is capable of dynamically varying its power consumption to comply with a dynamically set power limit specified by power limit controller 404. More specifically, power management logic 402 controls the operation of chip 401 to ensure that chip 401 maintains its power consumption within a dynamically set power limit. For instance, suppose at a first time, $t_1$, power limit controller 404 sets the power limit for chip 401 to a first value (e.g., 100 Watts), power management logic 402 controls the operation of chip 401 (e.g., by adjusting the voltage supplied to chip 401 and/or the clock frequency supplied to core 403) to maintain the chip's power consumption within the first value. Further suppose that at a later time, $t_2$, power limit controller 404 dynamically changes the power limit for chip 401 to a second value (e.g., 80 Watts); in response, power management logic 402 controls the operation of chip 401 (e.g., by adjusting the voltage supplied to chip 401 and/or the clock frequency supplied to core 403) to maintain the chip's power consumption within the newly set second value.

As mentioned above, various situations exist in which it may be desirable to dynamically vary the power limit of chip 401. For instance, chip 401 may be implemented in a multi-processor server system, such as a Utility Data Center, and during periods of low computational loads such processor 401 may not be required to be utilized and it may therefore be desirable to reduce its power limit during those periods. Power management software may be implemented in the Utility Data Center for monitoring the workloads of the various processors and manage the power limits of those processors (e.g., to raise the power limits during high computational loads for increased performance and to lower the power limits during lower computational loads for power conservation). As another example, chip 401 may be implemented in a portable device, such as a mobile telephone (e.g., cellular telephone), personal data assistant (PDA), laptop (or "notebook") computer, etc., and its power limit may be dynamically varied to extend the battery life of such devices (when not coupled to an AC source).

In an embodiment of the present invention, chip 401 is implemented to provide optimum performance within a specified power limit. That is, the chip's power limit may be dynamically varied (e.g., by power limit controller 404), and upon a specific power limit being set for chip 401, power management logic 402 controls the chip's operation (e.g., by adjusting the clock frequency supplied to core 403) to comply with the set power limit in a manner that provides optimum performance within the set power limit. Preferably, power management logic 402 implements a technique, such as that described above in conjunction with FIGS. 1-3, to consistently provide the fastest clock frequency possible to core 403 that enables the chip to remain within the dynamically set power limit. As noted above, the example self-regulation techniques described in conjunction with FIGS. 1-3 provide a seamless and fine-grained approach for achieving the most performance per Watt. For example, the techniques described above allow for operation at the highest processing speed (or fastest clock frequency) that is possible while remaining within a desired power consumption (e.g., remaining within a dynamically set power limit). Thus, one embodiment implements a power management technique (in logic 402) that is capable of dynamically varying the frequency of a clock signal supplied to core 403 in a manner that allows for the highest possible clock frequency while remaining within a given power limit, wherein such power limit may be dynamically set by power limit controller 404.

Further, certain embodiments of the present invention enable predictable performance of chip 401 under any of a plurality of different power limits that may be dynamically set for the chip. That is, in certain embodiments, the performance of chip 401 under each of a plurality of different power limits that may be dynamically set for the chip is accurately predictable. Particularly if optimum performance is provided at each power limit level, the performance of the chip will generally vary among different power limits. For instance, as those of ordinary skill in the art will appreciate, the maximum clock frequency provided to core 403 under a first power limit set for chip 401 (e.g., 100 Watts) will generally be different than the maximum clock frequency that may be provided to core 403 under a different power limit set for chip 401 (e.g., 30 Watts).

Thus, suppose a chip's maximum power limit is 100 Watts (W) and its maximum frequency under the 100 W power limit is 2.5 GHz. The maximum clock frequency achievable by a chip for its maximum power limit is generally well defined for the chip (e.g., and is a value that is quotable in the chip's specifications by the chip provider). However, if the chip's power limit is dynamically reduced from 100 W to, for example, 30 W, the chip's maximum frequency under this new power limit will likely change to a value less than the 2.5 GHz value that is achievable at its maximum power limit. While the chip's performance (e.g., clock frequency) may be reduced in response to the reduced power limit, such reduction in performance will, in most circumstances, be acceptable in order to achieve the reduced power limit. However, the value to which the chip's performance reduces under the reduced power limit is generally desired to be predictable. That is, while a performance less than that achievable at the maximum power limit may be acceptable in exchange for a reduced power limit, it is generally desirable to know the performance (at least to some degree of accuracy, such as 5% or less) that can be expected under the reduced power limit. For instance, if at least "X" clock frequency is needed for the chip to perform a given task within a desired time frame, then it may be desirable to predict whether and/or to what degree the chip's power limit can be reduced and still allow the chip to provide the needed "X" clock frequency.

As described briefly above, having predictable performance is generally desirable for a chip. Having a predictable level of performance is particularly important for microprocessors, for example, where users expect applications, such as streaming video, numerical simulations, etc., to perform to a specific level. Ensuring predictable frequency of operation for reduced power levels (i.e., less than the maximum power limit of a chip) is much more difficult than the traditional fixed power/frequency/voltage employed on most chips (e.g., on most very large-scale integration (VLSI) chips). There are several reasons for this difficulty, two of which are described below.

First, power consumption and frequency of operation (circuit speed) varies with temperature. For traditional chips, there is just a maximum, not to exceed temperature and the specified frequency of operation for the chip is guaranteed to be met as long as that temperature is not exceeded. Similarly, the maximum power for the chip is guaranteed not to be exceeded at the maximum temperature. For a voltage and frequency modulated chip, however, (such as chips implementing the power management techniques described above in conjunction with FIGS. 1-3), if the power limit is reduced from maximum, the impact this has on the chip's speed is unpredictable because temperature is typically not well controlled (except to ensure that it does not exceed the maximum temperature).

Second, manufacturing variations between chips cause them to consume different amounts of power for the same frequency of operation. Thus, even though two chips might be specified at 100 Watts (W) and 2.5 GHz performance, the first chip might consume 90 W and the second chip consumes 99 W to provide the 2.5 GHz performance. In either case, the 100 W limit is met in the above example, but if the power limit is reduced to 90 W, for example, the second chip will have to reduce its frequency (and voltage) to get its power consumption down from 99 W to 90 W but the first chip will not (as it was already at 90 W power consumption).

In view of the above, the specific maximum performance provided by a chip when its power limit is reduced below its maximum power limit may be unknown and difficult to predict. Further, the reduction in performance may not necessarily reduce in the same percentage that the power limit for the chip is reduced. For instance, if a chip's power limit is reduced by 10 percent of its maximum power limit, it does not necessarily follow that the chip's performance will be reduced by 10 percent of its maximum performance. Thus, there is a need for a method to provide consistent performance (e.g., frequency of operation) for chips operating at power limits lower than their maximum power limit.

For a chip with a power management system that enables it to control frequency of operation to a reasonably fine-grain level of accuracy (e.g., approximately a tolerance of 5% or less), this method can be a simple table lookup providing a frequency reduction value for a given power reduction value. Accordingly, in one embodiment of the present invention, chips are characterized to determine a mapping of performance values for corresponding power limit values. More specifically, a plurality of like chips (i.e., chips of the same design) are characterized to determine, for each of a plurality of different power limits, the maximum performance value that enables all of the chips to comply with a set power limit.

For example, assume a given chip set has a maximum power limit of 100 W and provide 100 MHz performance at their maximum power limit. A number (e.g., 100) of such chips are characterized at various reduced power limits. For instance, the chips may be characterized to determine the maximum clock frequency of each chip that enables the chip to maintain its power consumption at or below 80 W. The lowest clock frequency value determined for the chips may then be established as a predictable performance value that is achievable within an 80 W power limit for the chip set. Suppose, for example, that 100 of the chips are characterized to determine their maximum clock frequencies while complying with the 80 W power limit, and 90 MHz is determined as the maximum clock frequency at 80 W for 20 of the chips, 88 MHz is determined as the maximum clock frequency at 80 W for 20 of the chips, 87 MHz is determined as the maximum clock frequency at 80 W for 20 of the chips, 85 MHz is determined as the maximum clock frequency at 80 W for 20 of the chips, and 83 MHz is determined as the maximum clock frequency at 80 W for 20 of the chips. In this example, 83 MHz may be established as a predictable performance value for chips of this type at an 80 W power limit. That is, because all of the chips are capable of complying with the 80 W power limit when providing a maximum frequency of 83 MHz, the 83 MHz value may be established as the maximum frequency available for the chips at an 80 W power limit.

Techniques are well known in the art for characterizing the performance of a given chip design under a specified power limit, and therefore such techniques are not described in great detail herein. In certain techniques, the chips may be characterized under a plurality of different conditions, e.g., temperatures, computational loads presented thereto, etc., and their performance may be monitored under the conditions to determine the predictable performance that can be quoted for the chip design at various different power limit.

Accordingly, in one embodiment, the predictable performance of a particular chip design that is achieved (within an acceptable tolerance) under a given power limit is determined through characterization of the chips. Thereafter, a table may be constructed that maps various power limit values that may be dynamically set for the chip to the corresponding predictable performance values of the chip. For instance, in the above example, the mapping structure may map an 80 W power limit to 83 MHz clock frequency for the chip design. Such table (or other type of mapping structure, such as a data structure, etc.) may then be used to set the maximum clock frequency of a chip in response to its power limit being dynamically set to a value below its maximum power limit. An example implementation of such a table is described further below in conjunction with FIG. 5.

Figure 5:
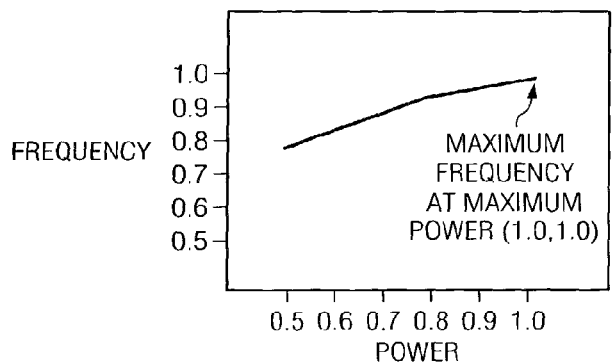
FIG. 5 shows an example graph for mapping predictable performance values of a chip to corresponding power limit values of the chip according to an embodiment of the present invention.

A table for mapping the predictable performance values to corresponding power limit values of a chip can be represented as a graph, such as that shown in FIG. 5. In the example of FIG. 5, the maximum power limit (and corresponding maximum frequency) of the chip is mapped to point (1.0, 1.0) of the graph. Various percentages of the chip's maximum power limit are provided along the horizontal axis of the graph, and various percentages of the chip's maximum clock frequency are provided along the vertical axis of the graph. So, if the maximum power limit of the chip is 100 W, setting it to 80 W (0.8 in the graph of FIG. 5), would result in the frequency being set to 0.9 times the maximum frequency. The exact relationship between power and frequency is preferably determined by characterization of typical silicon such that across all manufacturing variations and temperatures, the chip can be guaranteed to be within some tolerance (e.g., approximately 5% or less) of the specified frequencies for a given power limit. Thus, when quoting the performance of a microprocessor, a repeatable, predictable value can be given even for the less than maximum power limits that may be dynamically set for the chip.

An example algorithm for determining the frequency to be set for a chip responsive to a given power limit is:

```
If (set_power_limit < max_power)
    {
    frequency_multiplier =
        f_of_power[set_power_limit/max_power]
    }
    set chip clock frequency = frequency_multiplier * max_frequency,
wherein f_of_power[ ] is a matrix of values such as represented in the
graph of FIG. 5.
```

Thus, suppose that the maximum power limit for a chip ("max_power") is 100 W and its maximum frequency ("max_frequency") is 2.5 GHz, and further suppose that the power limit set for the chip ("set_power_limit") is 80 W. In accordance with the above example algorithm, because the set_power_limit is less than the max_power (i.e., 80 W<100 W), frequency_multiplier is set to f_of_power[80/100]. That is, the frequency_multiplier is determined by looking up the corresponding frequency value for 0.8 of the chip's maximum power (or 80/100) in the table illustrated by the graph of FIG. 5. In the example of FIG. 5, the frequency_multiplier corresponding to the power value 0.8 of the maximum power is 0.9. That is, the maximum frequency for the chip when its power limit is set to 0.8 of its maximum power plots to 0.9 of the maximum frequency in the example graph of FIG. 5. Further, in accordance with the above example algorithm the chip's clock frequency is set to frequency_multiplier* max_frequency, which in this example is 0.9*2.5 GHz.

Figure 6:
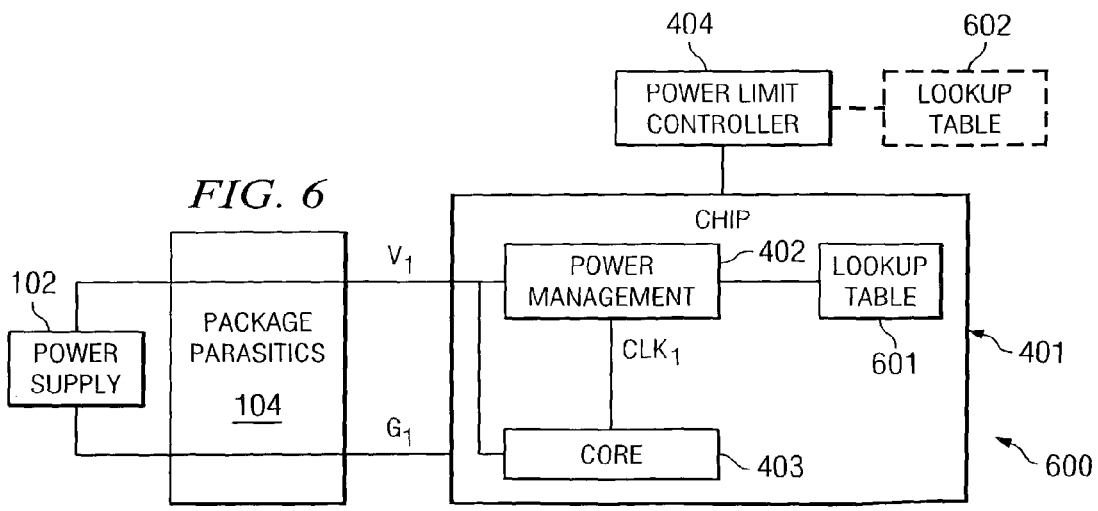
FIG. 6 shows an embodiment of the present invention in which a mapping structure, such as a table, is implemented for use by a chip in providing predictable performance at a dynamically selected power limit.

Turning to FIG. 6, an example implementation of a portion of a system 600 is shown. As in FIG. 4, system 600 comprises power supply 102 that supplies power to chip 401 through package parasitics 104, thus resulting in voltage signal $V_1$ and ground signal $G_1$ being received by chip 401. Chip 401 comprises core chip circuitry 403 and power management logic 402, as described above in FIG. 4. Further included in system 600 is power limit controller 404, as in FIG. 4. As further shown in this example implementation, chip 401 may comprise lookup table (or other suitable mapping structure) 601 that provides a mapping of predictable performance values for the chip to corresponding power limit values, such as described above in conjunction with FIG. 5. Thus, in operation chip 401 may receive notification from power limit controller 404 that its power limit value is reduced by X amount (e.g., X percent) below its maximum power limit, and in response thereto, power management logic 402 may access lookup table 601 to determine the maximum clock frequency that can be supplied to core 403 under the reduced power limit. That is, power management logic 402 may access lookup table 601 to determine for the reduced power limit value the maximum clock frequency that it can supply to core 403 without its power consumption exceeding the reduced power limit. Example operation of one embodiment of the present invention is described further below in conjunction with the example wave forms of FIG. 7.

As further shown in the example of FIG. 6, in certain implementations lookup table 602 (which may be identical to lookup table 601) may be provided within system 600 off of chip 401 instead of or in addition to lookup table 601 being included on chip 401. Lookup table (or other suitable mapping structure) 602 provides a mapping of predictable performance values for chip 401 to corresponding power limit values, such as described above in conjunction with FIG. 5. Thus, in operation of certain embodiments, power limit controller 404 (or other power management logic responsible for determining the proper power limit to be dynamically set for chip 401) may access lookup table 602 to determine the proper power limit to be set for chip 401. For instance, suppose power limit controller 404 desires to reduce the power limit of chip 401 as much as possible but ensure that it maintains a clock frequency of at least X amount (e.g., 100 MHz), power limit controller 404 may access lookup table 602 to determine the lowest power limit value that may be set for chip 401 that enables chip 401 to predictably provide at least the desired X clock frequency. Power limit controller may then set the power limit of chip 401 to the determined lowest power limit value that enables chip 401 to provide the desired X clock frequency.

In certain embodiments, power limit controller 404 may be capable of querying chip 401 for information from lookup table 601 included thereon in a manner similar to that described above with lookup table 602. Thus, for instance, power limit controller 404 may, in certain embodiments, query chip 401 for its lowest power limit value that enables it to provide at least X clock frequency. That is, information from lookup table 601 may be accessed by power limit controller 404 in certain embodiments to enable power limit controller 404 to make intelligent decisions regarding the proper power limit value to be dynamically set for chip 401.

Figure 7:
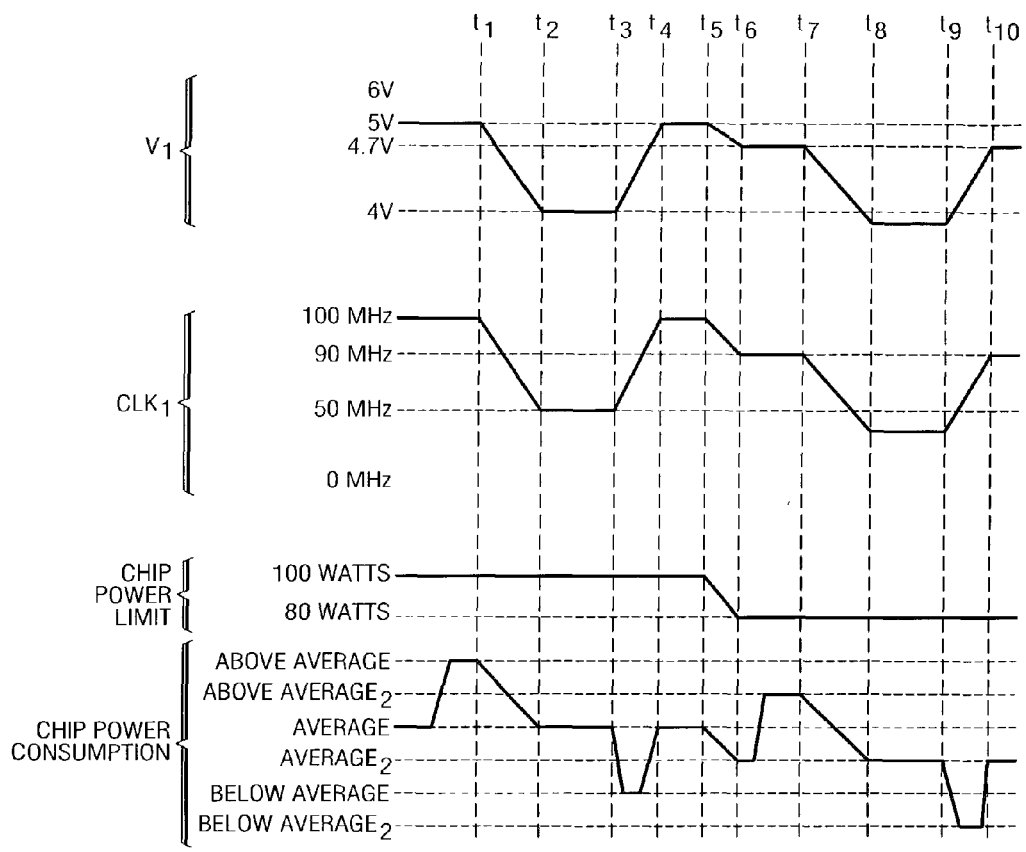
FIG. 7 shows exemplary wave forms that illustrate operation of an embodiment of the present invention in which the power limit of a chip is dynamically changed.

Turning now to FIG. 7, exemplary wave forms are shown that illustrate operation of an embodiment in which the power limit of a chip is dynamically changed. More specifically, an exemplary wave form is shown for voltage $V_1$ input to chip 401, clock $CLK_1$ generated by power management logic 402 (e.g., oscillator 108 of FIGS. 1 and 2), the power limit set for chip 401, and instantaneous chip power consumption. As shown, at time $t_0$, voltage $V_1$ is 5 V and the frequency of clock $CLK_1$ is 100 MHz, which results in no more than the set power limit of 100 W of external power being required to be distributed to chip 401.

As discussed above with FIG. 3, in one embodiment, the external power distributed to chip 401 remains relatively constant, while the instantaneous chip power consumption may vary significantly over time. For instance, at time $t_0$, the chip power consumption is at its average value. Some time later, between time $t_0$ and time $t_1$, the instantaneous chip power consumption goes above average (e.g., compute intensive operation may be performed by the core circuitry, thus causing the instantaneous chip power consumption to increase above average). When the chip power goes above average power, capacitor 201 (e.g., of FIG. 2) starts draining charge to supply the chip, in one embodiment. Thus, as the example of FIG. 7 shows, voltage $V_1$, frequency of $CLK_1$, and the external power distributed to chip 401 remain relatively constant from the time that the chip power increases above average until time $t_1$ (because capacitor 201 drains its charge to supply the chip the additional needed power). Example techniques for measuring a chip's power consumption, including instantaneous power consumption and sustained power consumption, are disclosed in U.S. Pat. No. 6,489,834 titled "SYSTEM AND METHOD UTILIZING ON-CHIP VOLTAGE MONITORING TO MANAGE POWER CONSUMPTION," the disclosure of which is hereby incorporated herein by reference.

Over time, if the chip power consumption remains above average, the charge will drain from capacitor 201 and voltage $V_1$ will droop, resulting in the chip power being reduced to the average value. For example, at time $t_1$, capacitor 201 is still supplying the necessary power to enable voltage $V_1$ to remain at 5V. Further, the frequency of clock $CLK_1$ output by power management logic 402 remains 100 MHz, with external power distributed to chip 401 remaining at 100 W. From time $t_1$ to time $t_2$, voltage $V_1$ droops from 5V to 4V (e.g., as the charge is drained from capacitor 201), and in response the frequency of clock $CLK_1$ output by power management logic 402 gradually decreases from 100 MHz to 50 MHz to maintain the external power distributed to chip 401 substantially at the 100 W power limit. As further shown in the example of FIG. 7, the decrease in voltage $V_1$ and frequency of $CLK_1$ results in a decrease in the instantaneous chip power consumption (back to its average). From time $t_2$ to time $t_3$ voltage $V_1$ remains at 4V, and in response the frequency of clock $CLK_1$ output by power management logic 402 remains at 50 MHz, thereby maintaining the instantaneous chip power consumption of chip 401 substantially at its average, while the external power required by chip 401 remains at the 100 W power limit.

Some time after time $t_2$, the instantaneous power chip consumption decreases below its average (e.g., as the compute intensive operation is completed). Thus, in response, from time $t_3$ to time $t_4$, voltage $V_1$ gradually increases from 4V back to 5V, and in response the frequency of clock $CLK_1$ output by power management logic 402 gradually increases from 50 MHz to 100 MHz. Accordingly, as the value of voltage $V_1$ increases, the frequency of clock $CLK_1$ output by power management logic 402 increases, thereby allowing faster operation of the core circuitry 403 of chip 401 without requiring an increase in external power distributed to chip 401.

At time $t_5$, power limit controller 404 dynamically changes the power limit of chip 401 from 100 W to 80 W. In response, from time $t_5$ to time $t_6$ the chip's power limit is reduced to the newly set limit of 80 W. In response to notification from power limit controller 404 that its power limit is set to 80 W, power management logic 402 sends a control signal to power supply 102 to change the supply voltage (VDD) supplied to chip 401. Power supplies, such as power supply 102, commonly have control bits (e.g., 6 control bits) that may be used to specify the voltage they are to supply. Power management logic 402 is preferably communicatively coupled to power supply 102 such that it can input such control bits to dynamically change the voltage supplied to chip 401 by power supply 102. Thus, upon receiving notification from power limit controller 404 that the chip's power limit is set to 80 W, power management logic 402 sends incremental voltage reduction commands to power supply 102 until the measured power consumed by chip 401 is determined to comply with the 80 W limit. Accordingly, preferably a power measurement scheme is implemented within power management logic 402 to determine when the measured power consumed by chip 401 complies with the 80 W limit. For instance, a power measurement scheme such as that disclosed in U.S. Pat. No. 6,489,834 titled "SYSTEM AND METHOD UTILIZING ON-CHIP VOLTAGE MONITORING TO MANAGE POWER CONSUMPTION," the disclosure of which has been incorporated herein by reference. In the example of FIG. 7, the chip's supply voltage $V_1$ (or VDD) is reduced by power management logic 402 from 5 V to 4.7 V.

Further, chip 401 accesses lookup table 601, which in this example provides the mapped values shown in FIG. 5. Thus, because the power limit is reduced to 0.8 of its maximum power limit (i.e., 80/100), power management logic 402 determines from lookup table 601 that the maximum clock frequency of $CLK_1$ is to be reduced to 0.9 of its maximum value (i.e., 0.9*100 MHz), as the power limit value 0.8 maps to frequency value 0.9 in the example of FIG. 5. Accordingly, responsive to the received notification of the reduced power limit value at time $t_5$ power management logic 402 determines that the new maximum frequency of clock $CLK_1$ is to be set to 90 MHz (i.e., 0.9*100 MHz). Thus, from time $t_5$ to time $t_6$ the frequency of clock $CLK_1$ is reduced from 100 MHz to 90 MHz. As described above, under the newly set supply voltage of 4.7 V, different chips of this design may provide different performance. However, using a mapping structure, such as table 601, certain embodiments of the present invention are capable of ensuring consistent, predictable performance across different chips of this design.

Accordingly, at time $t_6$ voltage $V_1$ is at 4.7 V and the frequency of clock $CLK_1$ is at 90 MHz, which results in no more than the reduced power limit of 80 W of external power being required to be distributed to chip 401. As further shown, the average power consumption for the chip drops to a new average value, shown as $AVERAGE_2$.

In view of the above, embodiments of the present invention enable the power limit of a chip to be dynamically varied (e.g., from 100 W to 80 W in the above example of FIG. 7). In one embodiment, the maximum clock signal frequency is dynamically changed by power management logic 402 (e.g., from 100 MHz to 90 MHz in the above example of FIG. 7) to enable the chip's power consumption to comply with the dynamically set power limit. Several well-known techniques exist for synthesizing a desired clock signal frequency, and any suitable technique may be used in embodiments of the present invention for dynamically changing the chip's clock signal frequency in this manner for managing the chip's power consumption to comply with a dynamically set power limit.

Figure 8:
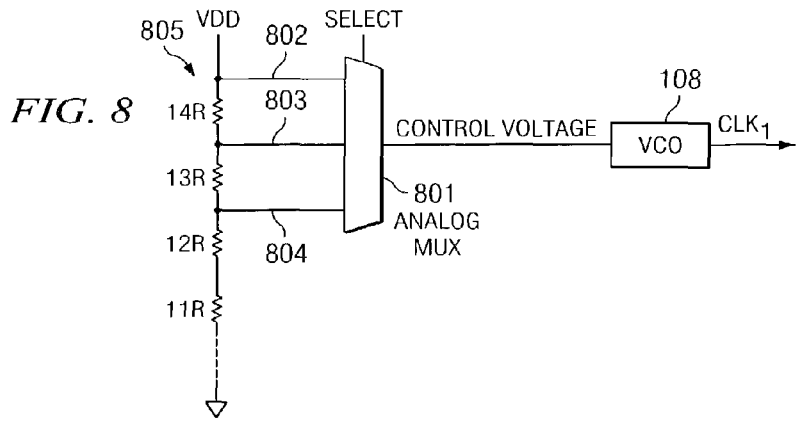
FIG. 8 shows an example implementation of frequency adjustment circuitry within the power management logic that comprises a resistive divider in conjunction with an analog voltage multiplexor that enable a maximum clock signal frequency of a chip to be dynamically changed responsive to a dynamically changed power limit for the chip.

In one embodiment, power management logic 402 comprises a voltage-controlled oscillator (VCO), as described above with FIGS. 1-2, for generating clock signal $CLK_1$ with which processing by the core circuitry 403 of chip 401 is synchronous. When such a VCO is used for generating clock signal $CLK_1$, an example technique for synthesizing the clock signal's frequency is to artificially reduce the control voltage with a resistive divider. If the normal control voltage is "VDD" (the supply being delivered to the chip 401), a resistive divider in conjunction with an analog voltage multiplexor can be used to conditionally reduce that voltage by a fixed ratio. The result is that the frequency of $CLK_1$ is reduced by a predictable amount from what would result from raw VDD. An example implementation using such a resistive divider in conjunction with an analog voltage multiplexor (MUX) is shown in FIG. 8. Turning briefly to the example of FIG. 8, the example resistive divider 805 shown comprises 14 resistors in series, with resistors 14R, 13R, 12R, and 11R specifically shown. Varying voltage values are selectively coupled from points along resistive divider 805, and are provided as inputs to MUX 801. In this example, the inputs 802, 803, and 804 to MUX 801 correspond to voltage values (1*VDD), (13/14*VDD), and (12/14*VDD), respectively. While only three inputs are shown in this example, it should be recognized that any number of voltage inputs may be supplied to MUX 801 in a similar manner in alternative implementations. The select signal input to MUX 801 selects which of the inputs 802, 803, and 804 MUX 801 is to output as the control voltage, which is in turn supplied to VCO 108. Thus, depending on the select signal, MUX 801 may output VDD (i.e., if input 802 is selected), (13/14*VDD) (i.e., if input 803 is selected), or (12/14*VDD) (i.e., if input 804 is selected) as the control voltage. The select signal input to MUX 801 may be determined based at least in part on a mapping structure (e.g., mapping structure 601 and/or 602 described above). While FIG. 8 shows an example technique for dynamically varying the maximum clock signal of chip 401, it should be understood that any other suitable technique for dynamically synthesizing such a maximum clock signal in accordance with embodiments of the present invention may be utilized in alternative embodiments.

In view of the above, the supply voltage and/or maximum clock frequency may be dynamically changed responsive to the chip's power limit value being dynamically changed in order to manage the chip's power consumption to be maintained within the dynamically set power limit. As described above, a mapping structure (e.g., mapping structure 601 and/or 602) may be used to determine the maximum clock frequency that is to be set for a given power limit value that is dynamically set for the chip. As described further below in conjunction with FIG. 7, in one embodiment power management logic 402 not only dynamically changes the maximum clock frequency responsive to the chip's power limit being dynamically changed, but it also dynamically varies the clock signal (e.g., to values not exceeding the set maximum clock frequency) responsive changes in voltage being consumed by the chip in order to maintain the chip's clock frequency at an optimum frequency during operation of the chip, without exceeding a dynamically set power limit of the chip.

Returning to FIG. 7, as discussed above with FIG. 3, in one embodiment, the external power distributed to chip 401 remains relatively constant, while the instantaneous chip power consumption may vary significantly over time. For instance, at time $t_6$, the chip power consumption is at its $AVERAGE_2$ value. Some time later, between time $t_6$ and time $t_7$, the instantaneous chip power consumption goes above $AVERAGE_2$ (e.g., compute intensive operation may be performed by the core circuitry, thus causing the instantaneous chip power consumption to increase above average, to a value shown as ABOVE $AVERAGE_2$). When the chip power goes above the $AVERAGE_2$ power, capacitor 201 (e.g., of FIG. 2) starts draining charge to supply the chip, in one embodiment. Thus, as the example of FIG. 7 shows, voltage $V_1$, frequency of $CLK_1$, and the external power distributed to chip 401 remain relatively constant from the time that the chip power increases above average until time $t_7$ (because capacitor 201 drains its charge to supply the chip the additional needed power).

Over time, if the chip power consumption remains above $AVERAGE_2$, the charge will drain from capacitor 201 and voltage $V_1$ will droop, resulting in the chip power being reduced to the $AVERAGE_2$ value. For example, at time $t_7$, capacitor 201 is still supplying the necessary power to enable voltage $V_1$ to remain at 4.7 V. Further, the frequency of clock $CLK_1$ output by power management logic 402 remains 90 MHz, with external power distributed to chip 401 remaining at 80 W. From time $t_7$ to time $t_8$, voltage $V_1$ droops from 4.7 V to a value just below 4 V (e.g., as the charge is drained from capacitor 201), and in response the frequency of clock $CLK_1$ output by power management logic 402 gradually decreases from 90 MHz to a lower value (e.g., 40 MHz) to maintain the external power distributed to chip 401 substantially at the 80 W power limit. As further shown in the example of FIG. 7, the decrease in voltage $V_1$ and frequency of $CLK_1$ results in a decrease in the instantaneous chip power consumption (back to its $AVERAGE_2$). From time $t_8$ to time $t_9$ voltage $V_1$ remains at just below 4 V, and in response the frequency of clock $CLK_1$ output by power management logic 402 remains at the lowered frequency (e.g., 40 MHz), thereby maintaining the instantaneous chip power consumption of chip 401 substantially at its $AVERAGE_2$, while the external power required by chip 401 remains at the 80 W power limit.

Some time after time $t_8$, the instantaneous power chip consumption decreases below its AVERAGE$_2$ (e.g., as the compute intensive operation is completed). Thus, in response, from time $t_9$ to time $t_{10}$, voltage $V_1$ gradually increases back to 4.7 V, and in response the frequency of clock CLK$_1$ output by power management logic 402 gradually increases back to 90 MHz. Accordingly, as the value of voltage $V_1$ increases, the frequency of clock CLK$_1$ output by power management logic 402 increases, thereby allowing faster operation of the core circuitry 403 of chip 401 without requiring an increase in external power distributed to chip 401.

As shown in the example of FIG. 7, an embodiment enables a chip's power limit to be dynamically set, and it provides the optimum performance under the dynamically set power limit. That is, it should be recognized that a chip's power limit may be dynamically set to a measured value and the chip's power consumption is self-regulated in a manner that complies with the set power limit value while providing optimum, predictable performance under such set power limit value.

Figure 9:
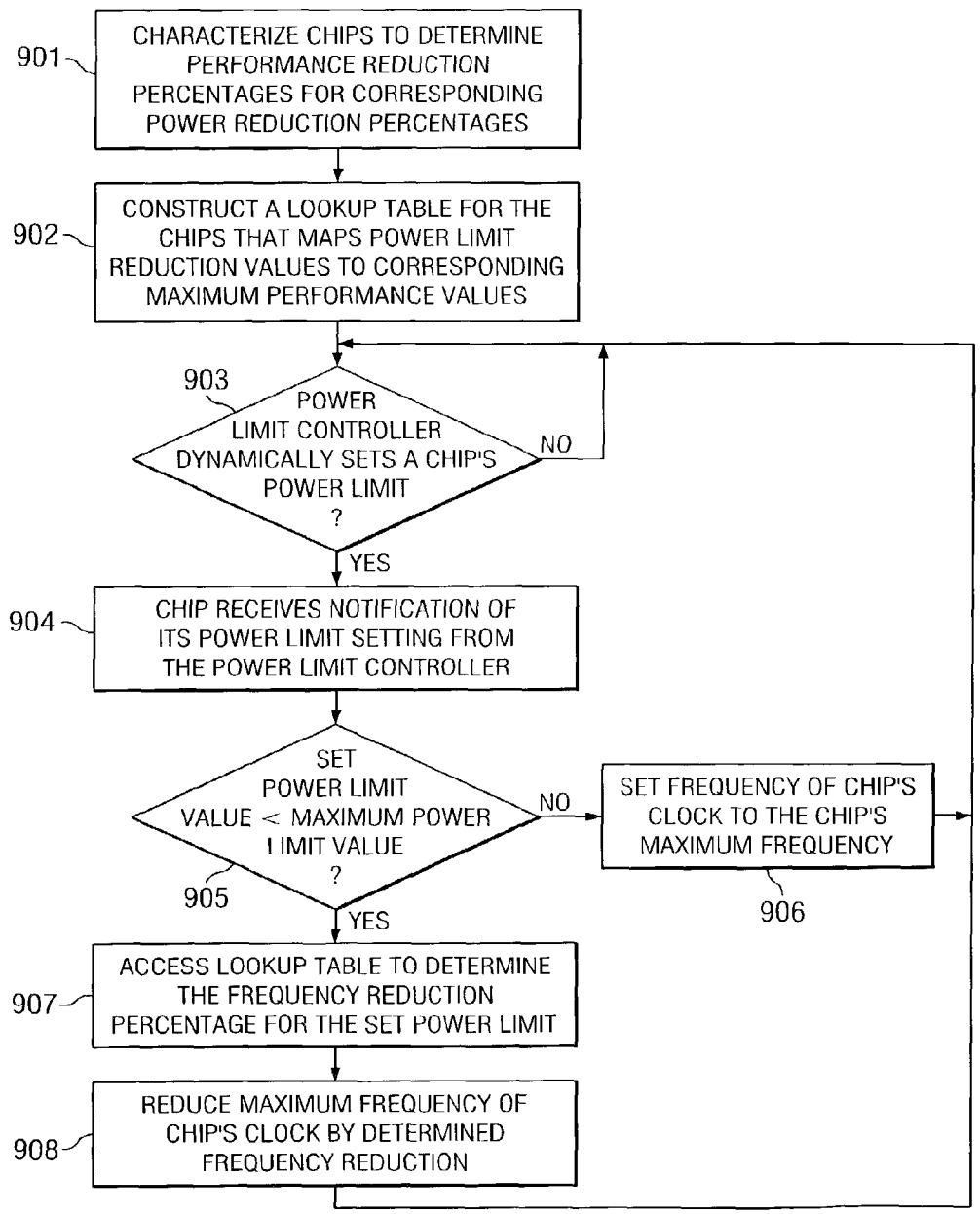
FIG. 9 shows an example operational flow diagram for implementing a chip having a dynamically variable power limit and operation of such chip in accordance with an embodiment of the present invention.

Turning now to FIG. 9, an example operational flow diagram for implementing a chip having a dynamically variable power limit and operation of such chip in accordance with an embodiment of the present invention is shown. In operational block 901, a plurality of chips of a particular design are characterized to determine performance reduction percentages for corresponding power reduction percentages.

In block 902, a lookup table (or other suitable mapping structure), such as lookup table 601 of FIG. 6, is constructed for the chips that maps power limit reduction values to corresponding maximum performance values that can be achieved within a tolerance by all manufactured chips of this design, such as described above in conjunction with FIG. 5. For instance, the chips may be characterized to determine the maximum clock frequency of each chip that enables the chip to maintain its power consumption at or below 80 W. The lowest clock frequency value determined for the chips may then be established as a predictable performance value that is achievable within an 80 W power limit for the chip set. Suppose, for example, that 100 of the chips are characterized to determine their maximum clock frequencies while complying with the 80 W power limit, and 90 MHz is determined as the maximum clock frequency at 80 W for 20 of the chips, 88 MHz is determined as the maximum clock frequency at 80 W for 20 of the chips, 87 MHz is determined as the maximum clock frequency at 80 W for 20 of the chips, 85 MHz is determined as the maximum clock frequency at 80 W for 20 of the chips, and 83 MHz is determined as the maximum clock frequency at 80 W for 20 of the chips. In this example, 83 MHz may be established as a predictable performance value for chips of this type at an 80 W power limit. That is, because all of the chips are capable of complying with the 80 W power limit when providing a maximum frequency of 83 MHz, the 83 MHz value may be established as the maximum frequency available for the chips at an 80 W power limit. Thus, the mapping structure 601 may be constructed that maps 80 W power limit to 83 MHz, as the maximum frequency predictably achievable (within a tolerance of, say, 5% or less), and the mapping structure 601 may further map various other power limit values to the corresponding predictable maximum frequency.

In operation of the chips, it is determined at operational block 903 whether power limit controller 404 dynamically sets the chip's power limit to some value. That is, it is determined whether chip 401 receives notification from power limit controller 404 that its power limit value is changed. If not, operation continues as normal for chip 401 and block 903 continues to monitor whether notification of a power limit change is received from power limit controller 404. If power limit controller 404 does change the power limit of chip 401, operation advances to block 904 whereat the chip receives notification of its power limit setting from power limit controller 404. Then, at block 905, chip 401 determines whether the set power limit value is less than the maximum power limit value of chip 401. In an embodiment, power management logic 402 determines whether the set power limit value is less than the chip's maximum power limit. If it is determined that the set power limit is not less than the chip's maximum power limit, operation advances to block 906 whereat chip management logic 402 sets the frequency of its clock to the chip's maximum frequency. Then, operation returns to block 903 to monitor whether power limit controller 404 changes the chip's power limit value.

If it is determined at block 905 that the set power limit is less than the chip's maximum power limit, operation advances to block 907. In block 907, power management logic 402 accesses the lookup table (e.g., table 601) to determine the frequency reduction percentage for the set power limit. Then, in operational block 908 power management logic 402 reduces the maximum frequency of chip 401 by the determined frequency reduction for the set power limit. For instance, in the example of FIG. 7, power limit controller 404 reduces the power limit of chip 401 from 100 W to 80 W at time $t_5$. Accordingly, such reduction of its power limit value is determined to be below the chip's maximum power limit value (of 100 W) in operational block 905 and so operation advances to block 907. In operational block 907, power management logic 402 accesses lookup table 601 to determine the frequency reduction percentage for the set power limit. More specifically, the corresponding frequency reduction percentage (0.9 in the example of FIG. 5) is determined for the set power reduction (0.8 of the maximum power limit in this example). Then, in operational block 908, power management logic 402 reduces the maximum frequency of chip 401 by the determined frequency reduction, e.g., computes 0.9*100 MHz to set the chip's frequency to 90 MHz in this example. Then, operation returns to block 903 to monitor whether power limit controller 404 changes the chip's power limit value.

In view of the above, it should be recognized that embodiments of the present invention advantageously provide an integrated circuit that has a dynamically variable power limit. More specifically, in certain embodiments of the present invention, a measured power limit value may be dynamically specified for a chip, and responsive thereto, the chip dynamically self-regulates its power consumption so as not to exceed the dynamically set power limit value. Further still, certain embodiments of the present invention provide an integrated circuit that is operable to self-regulate its power consumption so as to provide optimum clock signal frequency while maintaining its power consumption within a dynamically set power limit value. For instance, in certain embodiments, an integrated circuit comprises power management logic for dynamically varying a clock signal with which processing by the core circuitry is synchronous. The power management logic dynamically varies the clock signal responsive to voltage being consumed by the chip. Further still, one embodiment of the present invention provides an integrated circuit having a predictable performance for a plurality of different power limit values that may be dynamically set for the integrated circuit.

What is claimed is:

1. An integrated circuit comprising:
   core circuitry to perform processing synchronously with a clock signal;
   a mapping structure that maps different power limit values to corresponding frequency values of the clock signal, wherein the mapping structure includes a lookup table having entries mapping corresponding ones of the different power limit values to corresponding frequency values; and
   power management logic to:
      receive notification of a dynamically set power limit value for the integrated circuit;
      access the mapping structure using the dynamically set power limit value;
      determine, based on accessing the mapping structure, a frequency value of the clock signal for complying with the dynamically set power limit value, and
      dynamically set the clock signal to the determined frequency value for managing power consumption of the integrated circuit to comply with the dynamically set power limit value.

2. The integrated circuit of claim 1, wherein the power management logic is to dynamically set the clock signal to the determined frequency value based at least in part on adjusting a voltage supplied to the core circuitry.

3. The integrated circuit of claim 2, wherein the power management logic comprises a voltage controlled oscillator for generating the clock signal.

4. The integrated circuit of claim 3, wherein a common voltage is supplied to the voltage controlled oscillator and the core circuitry.

5. The integrated circuit of claim 1, wherein the lookup table stores the clock signal frequency values that are each a maximum frequency value that is consistently achievable by the integrated circuit without exceeding a corresponding power limit value, and wherein the entries of the lookup table each stores information mapping a corresponding one of the different power limit values to a corresponding one of the clock signal frequency values.

6. The integrated circuit of claim 1, wherein the determined frequency value is a maximum frequency of the clock signal that is predictably achievable by the integrated circuit without exceeding the dynamically set power limit value.

7. The integrated circuit of claim 1, wherein the power management logic is to be communicatively coupled to a power supply that provides a supply voltage to the integrated circuit, and wherein the power management logic is to cause dynamic varying of the supply voltage supplied by the power supply to the integrated circuit to dynamically regulate the integrated circuit's power consumption.

8. The integrated circuit of claim 1, further comprising:
   a power limit controller to provide the notification of the dynamically set power limit value, where the dynamically set power limit value is selectable by the power limit controller from a plurality of specific power limit values.

9. The integrated circuit of claim 8, wherein the power limit controller is to access the mapping structure to select the dynamically set power limit value from the plurality of specific power limit values that are contained in the mapping structure, where the power limit controller is to select the dynamically set power limit value based on a target frequency of the clock signal to be achieved.

10. The integrated circuit of claim 1, wherein the mapping structure contains content based on characterization of multiple integrated circuits of a particular design, the characterization determining, for each of the different power limit values of the multiple integrated circuits, a predictable clock signal frequency that is achievable within a tolerance by all of the multiple integrated circuits without power consumption of the multiple integrated circuits exceeding the corresponding power limit value.

11. A system comprising:
   a power supply; and
   an integrated circuit coupled to the power supply and comprising:
      core circuitry to perform processing synchronously with a clock signal;
      a mapping structure that stores information mapping different power limit values to corresponding frequency values of the clock signal; and
      power management logic to:
         receive notification of a dynamically set power limit value for the integrated circuit;
         access the mapping structure using the dynamically set power limit value, wherein the dynamically set power limit value maps to a specific subset of the information stored in the mapping structure;
         determine, based on accessing the mapping structure, a frequency value of the clock signal for complying with the dynamically set power limit value, the determined frequency value stored in the specific subset of the information stored in the mapping structure, and
         dynamically set the clock signal to the determined frequency value for managing power consumption of the integrated circuit to comply with the dynamically set power limit value.

12. The system of claim 11, further comprising a power limit controller to provide the notification of the dynamically set power limit value.

13. The system of claim 12, wherein the power limit controller is to select the dynamically set power limit value from a plurality of specific power limit values.

14. The system of claim 13, further comprising a second mapping structure to map power limit values to corresponding frequency values of the clock signal, wherein the power limit controller is to select the dynamically set power limit value based on accessing the second mapping structure for achieving a target frequency value of the clock signal.

15. The system of claim 11, wherein the mapping structure includes a lookup table having entries mapping corresponding ones of the different power limit values to the corresponding frequency values of the clock signal.

16. The system of claim 11, wherein the mapping structure includes a matrix that maps corresponding ones of the different power limit values to the corresponding frequency values of the clock signal.

17. A system comprising:
   a power supply; and
   an integrated circuit coupled to the power supply and comprising:
      core circuitry to perform processing synchronously with a clock signal;
      a mapping structure that maps different power limit values to corresponding frequency values of the clock signal; and
      power management logic to:
         receive notification of a dynamically set power limit value for the integrated circuit;
         access the mapping structure using the dynamically set power limit value;

determine, based on accessing the mapping structure, a frequency value of the clock signal for complying with the dynamically set power limit value, and dynamically set the clock signal to the determined frequency value for managing power consumption of the integrated circuit to comply with the dynamically set power limit value, wherein the mapping structure contains content based on characterization of multiple integrated circuits of a particular design, the characterization determining, for each of the different power limit values of the multiple integrated circuits, a predictable clock signal frequency that is achievable within a tolerance by all of the multiple integrated circuits without power consumption of the multiple integrated circuits exceeding the corresponding power limit value.

18. A method for dynamically varying an integrated circuit's power limit, comprising:

receiving, at an integrated circuit, notification that the integrated circuit's power limit setting is changed to a particular power limit value;

in response to the notification, accessing a mapping structure that stores information mapping different power limit values to corresponding frequency values of a clock signal in the integrated circuit, wherein the particular power limit value specified by the notification maps to a specific subset of the information stored in the mapping structure;

determining, based on accessing the mapping structure, a frequency value of the clock signal, the determined frequency value stored in the specific subset of the information stored in the mapping structure; and dynamically setting the clock signal to the determined frequency value for managing power consumption of the integrated circuit to comply with the dynamically set power limit value.

19. The method of claim 18, wherein accessing the mapping structure comprises accessing a lookup table having entries mapping corresponding ones of the different power limit values to corresponding frequency values, and wherein accessing the lookup table comprises retrieving information stored in one of the entries that maps to the particular power limit value, the retrieved information containing the determined frequency value of the clock signal.

20. The method of claim 18, wherein the mapping structure contains content based on characterization of multiple integrated circuits of a particular design, the characterization determining, for each of the different power limit values of the multiple integrated circuits, a predictable clock signal frequency that is achievable within a tolerance by all of the multiple integrated circuits without power consumption of the multiple integrated circuits exceeding the corresponding power limit value.

\* \* \* \* \*